United States Patent
Hsiao et al.

(10) Patent No.: US 10,372,364 B2
(45) Date of Patent: Aug. 6, 2019

(54) STORAGE ENCLOSURE WITH DAISY-CHAINED SIDEBAND SIGNAL ROUTING AND DISTRIBUTED LOGIC DEVICES

(71) Applicant: Super Micro Computer, Inc., San Jose, CA (US)

(72) Inventors: RS Hsiao, San Francisco, CA (US); Kelvin Tseng, San Jose, CA (US); Lawrence H. Liang, San Jose, CA (US); Richard Chen, San Jose, CA (US)

(73) Assignee: SUPER MICRO COMPUTER, INC., San Jose, CA (US)

( * ) Notice: Subject to any disclaimer, the term of this patent is extended or adjusted under 35 U.S.C. 154(b) by 11 days.

(21) Appl. No.: 15/132,158

(22) Filed: Apr. 18, 2016

(65) Prior Publication Data

US 2017/0300264 A1    Oct. 19, 2017

(51) Int. Cl.
| | |
|---|---|
| *G06F 3/06* | (2006.01) |
| *G11B 33/12* | (2006.01) |
| *G11B 33/02* | (2006.01) |
| *G06F 1/26* | (2006.01) |
| *G06F 1/3234* | (2019.01) |
| *G06F 1/3287* | (2019.01) |
| *G11B 19/20* | (2006.01) |

(52) U.S. Cl.
CPC .......... *G06F 3/0634* (2013.01); *G06F 1/266* (2013.01); *G06F 1/3268* (2013.01); *G06F 1/3287* (2013.01); *G06F 3/0604* (2013.01); *G06F 3/0659* (2013.01); *G06F 3/0689* (2013.01); *G11B 19/209* (2013.01); *G11B 33/02* (2013.01); *G11B 33/126* (2013.01); *Y02D 10/154* (2018.01); *Y02D 10/171* (2018.01)

(58) Field of Classification Search
CPC ....... G06F 1/266; G06F 1/3268; G06F 1/3287
See application file for complete search history.

(56) References Cited

U.S. PATENT DOCUMENTS

| | | | |
|---|---|---|---|
| 5,058,004 A * | 10/1991 | Ravid | G06F 3/0601 710/2 |
| 6,192,481 B1 * | 2/2001 | Deenadhayalan | G06F 1/3221 711/114 |
| 6,754,720 B1 * | 6/2004 | Packer | G06F 12/0661 709/234 |
| 7,234,023 B2 * | 6/2007 | Abe | G06F 3/0614 711/112 |

(Continued)

*Primary Examiner* — Midys Rojas
*Assistant Examiner* — Khoa D Doan
(74) *Attorney, Agent, or Firm* — Artegis Law Group, LLP

(57) ABSTRACT

A storage enclosure includes a plurality of hard drive sub-boards, each configured to include a plurality of hard drives. A local logic device manages each hard drive sub-board. A master logic device manages the local logic devices. The master logic device receives management commands from a host computer system coupled to the storage enclosure, and routes those commands to specific local logic devices. The local logic devices then relay the commands to specifically targeted hard drives. Thus, each hard drive within the storage enclosure can be independently controlled, allowing a single hard drive to be powered down without powering down other hard drives in the enclosure.

19 Claims, 6 Drawing Sheets

(56) References Cited

U.S. PATENT DOCUMENTS

| | | | | |
|---|---|---|---|---|
| 7,350,088 B2* | 3/2008 | Allison | G06F 1/266 | 713/300 |
| 7,434,090 B2* | 10/2008 | Hartung | G06F 11/1092 | 714/6.2 |
| 7,536,584 B2* | 5/2009 | Davies | G06F 11/0727 | 714/5.11 |
| 7,634,615 B2* | 12/2009 | Sutardja | G06F 1/3221 | 711/100 |
| 7,639,493 B2* | 12/2009 | Hori | G06F 1/3221 | 360/69 |
| 7,734,867 B1* | 6/2010 | Keeton | G06F 3/0625 | 711/114 |
| 8,001,393 B2* | 8/2011 | Hori | G06F 1/3203 | 710/316 |
| 8,006,111 B1* | 8/2011 | Faibish | G06F 1/3221 | 711/114 |
| 8,161,303 B2* | 4/2012 | Hakamata | G06F 1/3221 | 360/69 |
| 8,171,214 B2* | 5/2012 | Fujimoto | G06F 1/3203 | 711/114 |
| 8,839,028 B1* | 9/2014 | Polia | G06F 11/1084 | 714/6.24 |
| 9,047,172 B2* | 6/2015 | Burke | G06F 12/02 | |
| 9,183,169 B2* | 11/2015 | Jones | H04L 29/08846 | |
| 2003/0079156 A1* | 4/2003 | Sicola | G06F 11/0727 | 714/4.1 |
| 2003/0191890 A1* | 10/2003 | Okamoto | G06F 3/0607 | 711/112 |
| 2004/0042408 A1* | 3/2004 | Sakai | G06F 11/0727 | 370/241 |
| 2004/0193791 A1* | 9/2004 | Felton | G11B 33/126 | 711/112 |
| 2004/0236908 A1* | 11/2004 | Suzuki | G06F 3/0607 | 711/114 |
| 2005/0022064 A1* | 1/2005 | Steinmetz | G06F 11/0727 | 714/42 |
| 2005/0177683 A1* | 8/2005 | Isobe | G06F 3/0607 | 711/114 |
| 2005/0228943 A1* | 10/2005 | DeCenzo | G06F 11/1076 | 711/114 |
| 2005/0278581 A1* | 12/2005 | Jiang | G06F 11/2007 | 714/40 |
| 2005/0289361 A1* | 12/2005 | Sutardja | G06F 1/3221 | 713/300 |
| 2007/0276976 A1* | 11/2007 | Gower | G06F 13/4243 | 710/305 |
| 2009/0006752 A1* | 1/2009 | Bartley | G06F 13/1684 | 711/122 |
| 2009/0132838 A1* | 5/2009 | Cherian | G06F 1/3203 | 713/320 |
| 2009/0204743 A1* | 8/2009 | Inoue | G06F 11/201 | 711/100 |
| 2013/0282944 A1* | 10/2013 | Shaw | G06F 13/4022 | 710/305 |
| 2014/0025850 A1* | 1/2014 | Varchavtchik | G06F 3/0689 | 710/74 |
| 2014/0149658 A1* | 5/2014 | Boyd | G06F 3/0607 | 711/112 |
| 2014/0215107 A1* | 7/2014 | Morabad | G06F 13/00 | 710/100 |
| 2014/0310441 A1* | 10/2014 | Klughart | G06F 3/0608 | 710/301 |
| 2015/0143037 A1* | 5/2015 | Smith | G06F 3/061 | 711/103 |
| 2015/0149684 A1* | 5/2015 | Dhandapani | G06F 13/4282 | 710/313 |
| 2015/0363109 A1* | 12/2015 | Frick | G06F 1/3203 | 711/112 |
| 2016/0335220 A1* | 11/2016 | Breakstone | G06F 13/4068 | |
| 2017/0270069 A1* | 9/2017 | Breakstone | G06F 13/4022 | |

\* cited by examiner

STORAGE ENCLOSURE WITH DAISY-CHAINED SIDEBAND SIGNAL ROUTING AND DISTRIBUTED LOGIC DEVICES

BACKGROUND OF THE INVENTION

Field of the Invention

Embodiments of the present invention relate generally to storage enclosures, and, more specifically, to storage enclosures with daisy-chained sideband signal routing and distributed logic devices.

Description of the Related Art

A conventional storage enclosure includes an expander coupled to a single large printed circuit board (PCB). The single large PCB includes a collection of ports for mounting hard drives. Each hard drive is coupled to the expander via one or more different traces embedded in the PCB. The expander includes a logic device configured to transmit and receive various types of data, via the PCB traces, to and from the hard drives mounted to the PCB. The data could be, for example, read data or write data. The expander is also configured to transmit various commands, via the PCB traces, to the hard drives mounted to the PCB. The commands could be, for example, I/O commands, for reading and/or writing data, or power management commands.

One drawback of the above conventional configuration is that the power management commands transmitted to the various hard drives are synchronized; therefore, the logic device cannot be configured to transmit an individual power management command that targets just one hard drive. Consequently, if one hard drive needs to be shut down, all hard drives in the storage enclosure must be shut down. For example, if one drive suffered a hardware failure and needed to be deactivated and then replaced, all hard drives would also need to be deactivated. Another drawback is that the PCB must include sufficient PCB traces to accommodate the transmission of both I/O data and I/O commands, potentially requiring a large number of PCB traces. These traces may induce crosstalk with one another, especially as the number of PCB traces increases. To avoid such crosstalk problems, the number of hard drives that are typically included within the storage enclosure is purposefully limited.

As the foregoing illustrates, what is needed is a more effective way to control the different hard drives within a storage enclosure.

SUMMARY OF THE INVENTION

Various embodiments of the present invention sets forth a storage enclosure, including a set of hard drives that includes a first hard drive and a second hard drive, and a first logic device coupled to each hard drive included in the set of hard drives and configured to receive a first management command that is directed to the first hard drive, and transmit the first management command to the first hard drive for execution, wherein executing the first management command changes the operating state of the first hard drive without changing the operating state of the second hard drive.

At least one advantage of the disclosed approach is that a host computer system coupled to the storage enclosure can exercise fine-grained control over the hard drives include within that enclosure. Thus, the host computer system can selectively power on and power off specific hard drives within the enclosure without affecting other hard drives.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
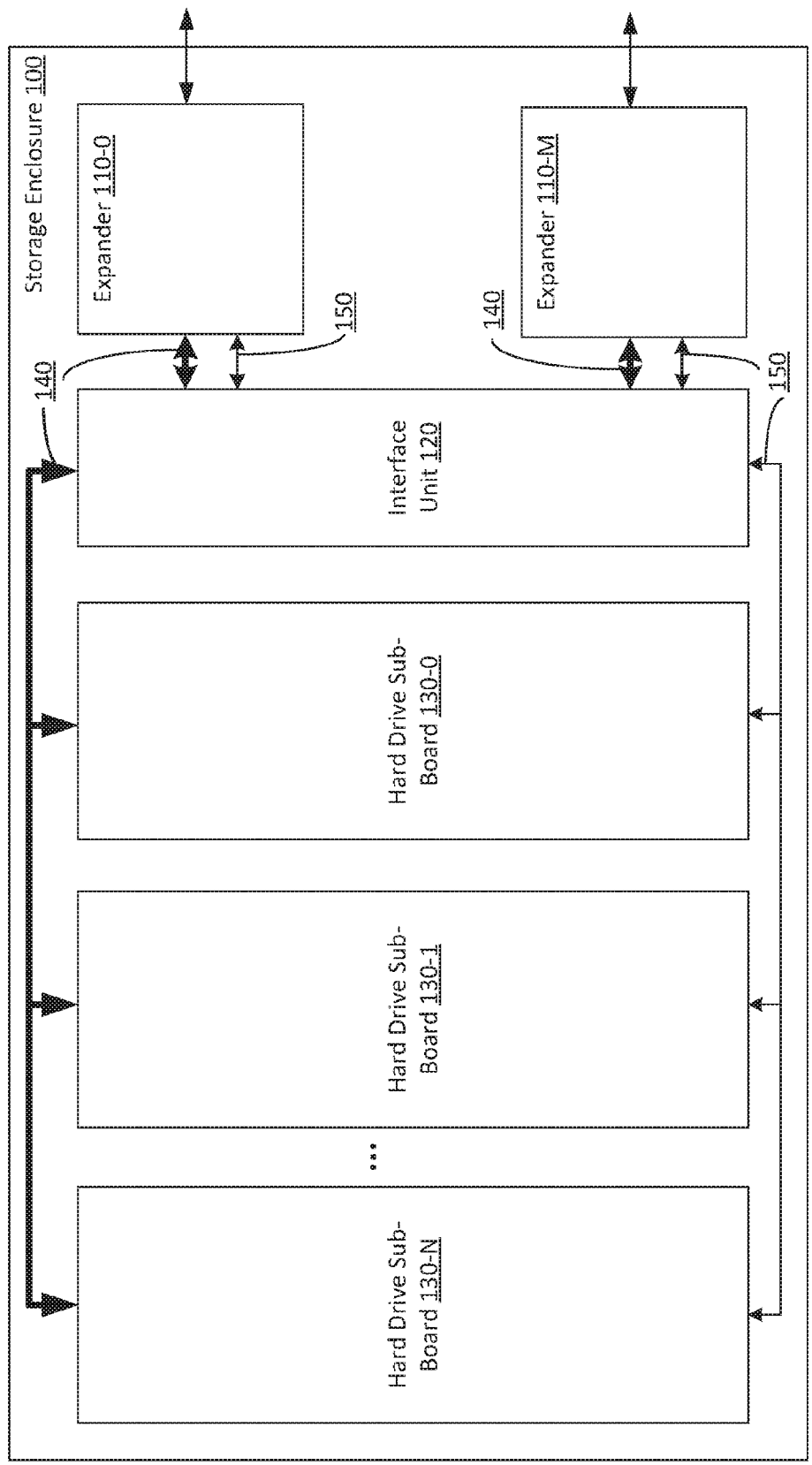
FIG. 1 is a block diagram of a storage enclosure, according to various embodiments of the present invention.

FIG. 1 is a block diagram of a storage enclosure, according to various embodiments of the present invention. As shown, storage enclosure 100 includes a plurality of expanders 110-0 through 110-M, an interface unit 120, and a plurality of hard drive sub-boards 130-0 through 130-N, each configured to include a plurality of hard drives (not shown here). Storage enclosure 100 may include any number of expanders 110, although in practice, storage enclosure 100 includes two expanders. Similarly, storage enclosure 100 may include any number of hard drive sub-boards 130, although in practice, storage enclosure 100 typically includes three hard drive sub-boards 130.

Expanders 110 are coupled to interface unit 120, and interface unit 120 is coupled to hard drive sub-boards 130. Expanders 110 include a plurality of plugs (not shown) which couple directly to interface unit 120. Interface unit 120 is coupled to each hard drive sub-board 130 via a set of primary cables 140 and a set of sideband cables 150. Primary cables 140 generally transport I/O data, including I/O commands and read/write data. Primary cables 140 may include multiple different subsets of cables, where each subset is coupled to a different hard drive sub-board. Sideband cables 150 generally transport management commands, including power management commands, power cycling commands, operational and control commands, and other commands that affect the operational state of the hard drives coupled to each hard drive sub-board 130.

In operation, expanders 110 transport I/O data to and from a host computer system (not shown) coupled upstream of those expanders. As mentioned above, "I/O data" generally includes I/O commands and associated read/write data. Expanders 110 also transport management commands received from the host computer system. Expanders 110 include various circuitry configured to transport the I/O data and management commands to and/or from specific ports within interface unit 120. An exemplary expander 110 is discussed in greater detail below in conjunction with FIG. 3.

Interface unit 120 receives I/O data and management commands from expanders 110 and then transmits that data along primary cables 140 and sideband cables 150, respectively, to specific hard drives within hard drive sub-boards 130. Interface unit 120 may also receive I/O data (such as, e.g., read data) from the hard drives within hard drive sub-boards 130 via cables 140 and then provide that data to expanders 110 for transmission to the host computer system.

Each hard drive sub-board 130 includes a plurality of hard drive groups (not shown here). Each hard drive group includes a set of hard drives. Each hard drive sub-board 130 also includes a complex logic device (CPLD) that is configured to manage the operational state of each hard drive within each hard drive group on the hard drive sub-board 130. The CPLD for a given hard drive sub-board is capable of separately routing management commands to each hard drive and/or executing management commands on behalf of those hard drives to change the operating state of each such hard drive. Thus, management commands can be individually directed to each hard drive within storage enclosure 100 by routing those commands through the relevant CPLD. An exemplary hard drive sub-board 130 is described in greater detail below in conjunction with FIG. 2.

Figure 2:
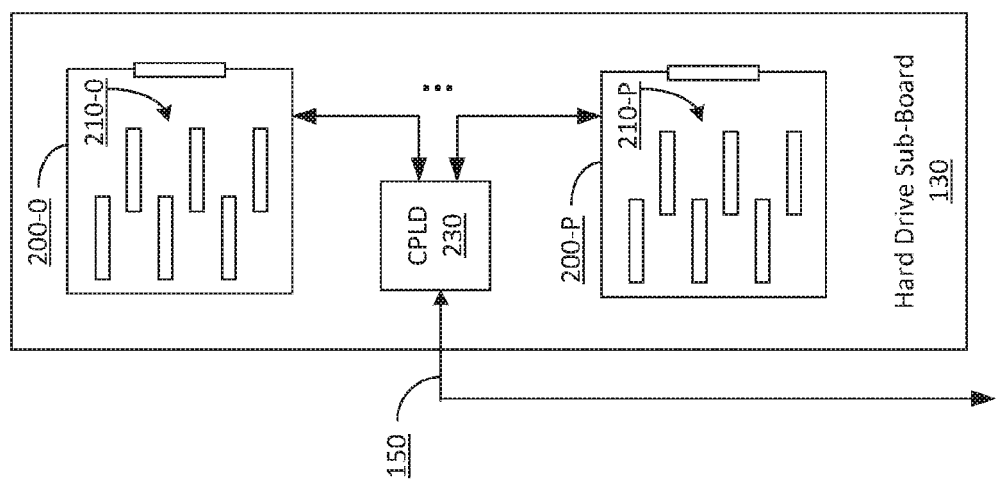
FIG. 2 is a more detailed block diagram of a hard drive sub-board within the storage enclosure of FIG. 1, according to various embodiments of the present invention.

FIG. 2 is a more detailed block diagram of a hard drive sub-board within the storage enclosure of FIG. 1, according to various embodiments of the present invention. As shown, hard drive sub-board 130 includes hard drive groups 200-0 through 200-P. Hard drive sub-board 130 may include any number of hard drive groups, although in practice, hard drive sub-board 130 includes five hard drive groups 200. Each hard drive group 200 includes a set of hard drives 210. Hard drive group 200-0 includes hard drives 210-0, and hard drive group 200-P includes hard drives 210-P.

Each hard drive group 200 is coupled to CPLD 230. CPLD 230 is configured to manage the operation of each hard drive 210 within disk sub-board 130. CPLD 230 is coupled to sideband cable 150, and configured to receive management commands via sideband cable 150. Sideband cable 150 is coupled upstream to one or more master CPLDs that manage CPLDs 230 within the various hard drive sub-boards 130 of storage enclosure 100. Each expander 110 includes a master CPLD, as described in grater detail below in conjunction with FIG. 3.

Figure 3:
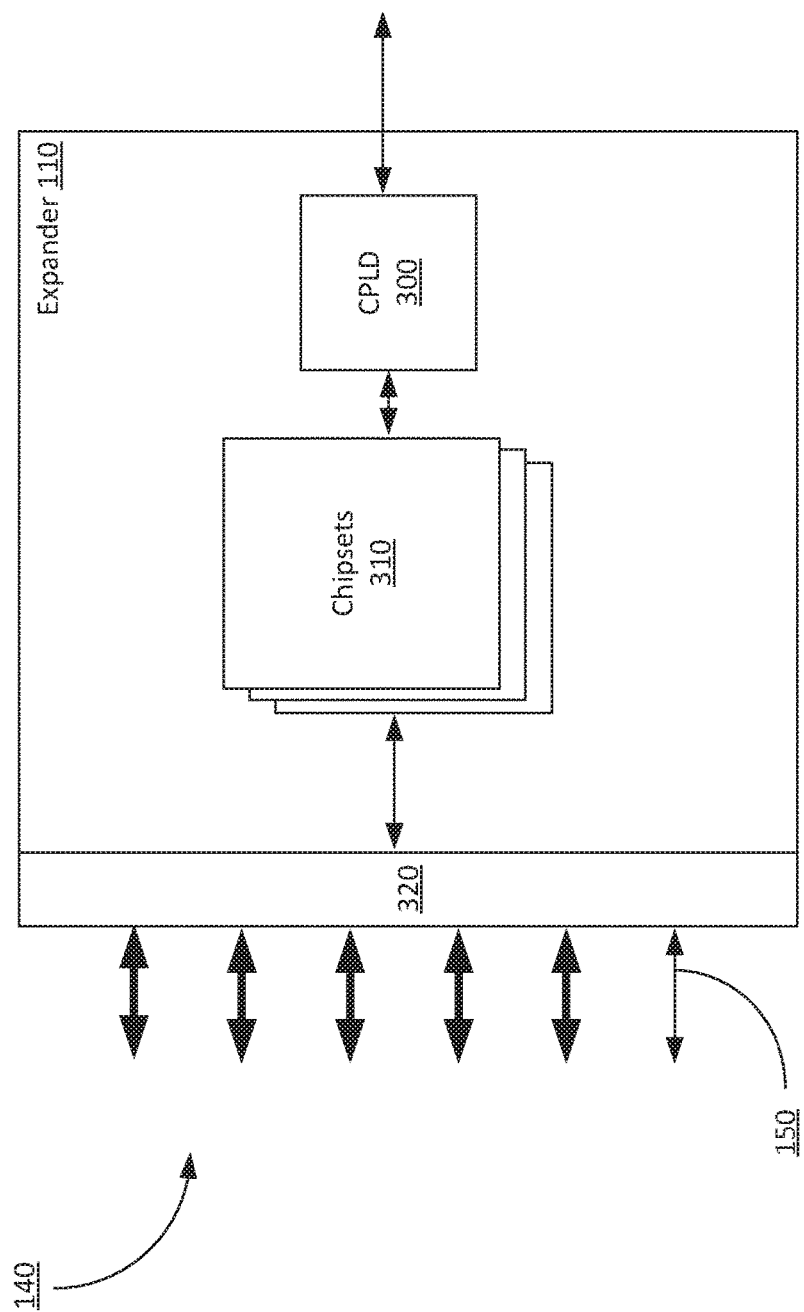
FIG. 3 is a more detailed block diagram of an expander within the storage enclosure of FIG. 1, according to various embodiments of the present invention.

FIG. 3 is a more detailed block diagram of an expander within the storage enclosure of FIG. 1, according to various embodiments of the present invention. As shown, expander 110 includes CPLD 300, one or more chipsets 310, and I/O ports 320. CPLD 300 is configured to receive I/O data and management commands from a host computer system and to transmit that data to chipsets 310. Each of chipsets 310 generally processes I/O data and management commands for a different subset of hard drives 210 within storage enclosure 100. Chipsets 310 transmit I/O data to hard drive sub-boards 130 for delivery to hard drives 210 via primary cable 140, and transmit management commands to hard drive sub-boards 130 for delivery to CPLDs 230 via sideband cables 150. The CPLD 230 within a given hard drive sub-board 130 then routes those management commands to the appropriate hard drive(s) 210 or executes those commands for the appropriate hard drive(s) 210.

Figure 4:
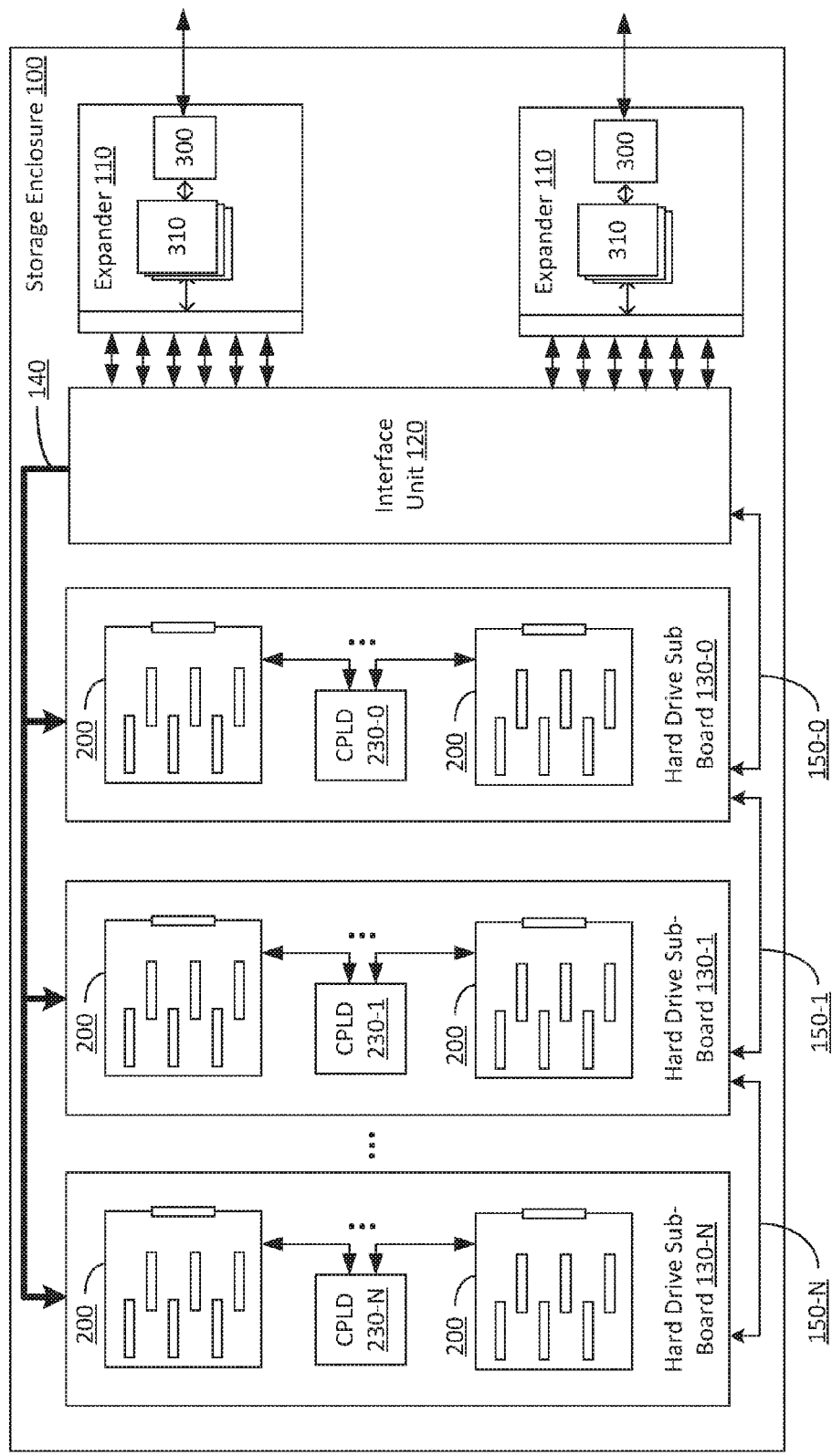
FIG. 4 is a more detailed block diagram of the storage enclosure of FIG. 1, according to various embodiments of the present invention.

FIG. 4 is a more detailed block diagram of the storage enclosure of FIG. 1, according to various embodiments of the present invention. As shown, storage enclosure 100 includes the various components described in detail in conjunction with FIGS. 2-3. As also shown, hard drive sub-boards 130 are daisy-chained together via sideband sub-cables 150-0, 150-1, and 150-N, thereby forming sideband cables 150 shown in FIG. 1. A given CPLD 230 is configured to receive management commands for the hard drives 210 within the hard drive sub-board 130 where the CPLD 230 resides. In addition, certain upstream CPLDs 230 may receive management commands that target downstream CPLDs 230, and then relay those commands to those downstream CPLDs 230.

For example, CPLD 230-0 could receive management commands from interface unit 120 that target hard drives 210 within hard drive sub-board 130-0. In addition, CPLD 230-0 could receive management commands that target hard drives 210 within hard drive sub-board 130-1. CPLD 230-0 would then relay those management commands to CPLD 230-1, and CPLD 230-1 would then transmit the received management commands to hard drives 210 within hard drive sub-board 130-1. By implementing daisy-chained sideband cables 150 in this fashion, the amount of cabling within storage enclosure 100 can be minimized. In addition, by coupling sideband cables 150 to hard drive sub-boards 130 separately from the couplings associated with primary cable 140, the size of a connector needed to couple to hard drive sub-boards 130 may also be minimized.

Referring generally to FIGS. 1-4, the configuration of CPLDs and cabling discussed thus far confers certain functionality to storage enclosure 100, which allows fine-grained control over individual hard drives included in that storage enclosure. In particular, since CPLDs 230 are distributed to different subsets of hard drives 210 within different hard drive sub-boards 130, each such CPLD 230 may exercise discrete control over the hard drives 210 within the respective hard drive sub-board 130. Further, since all CPLDs 230 are governed by master CPLDs 300, the host computer system coupled to CPLDs 300 may alter the operational state of each hard drive 210 within storage enclosure 100 independently. This functionality allows a hard drive 210 to be independently powered on or off, power cycled, or more generally, to enter any specific operating state, without affecting any other hard drives 210. This functionality is also described, in stepwise fashion, below in conjunction with FIG. 5.

Figure 5:
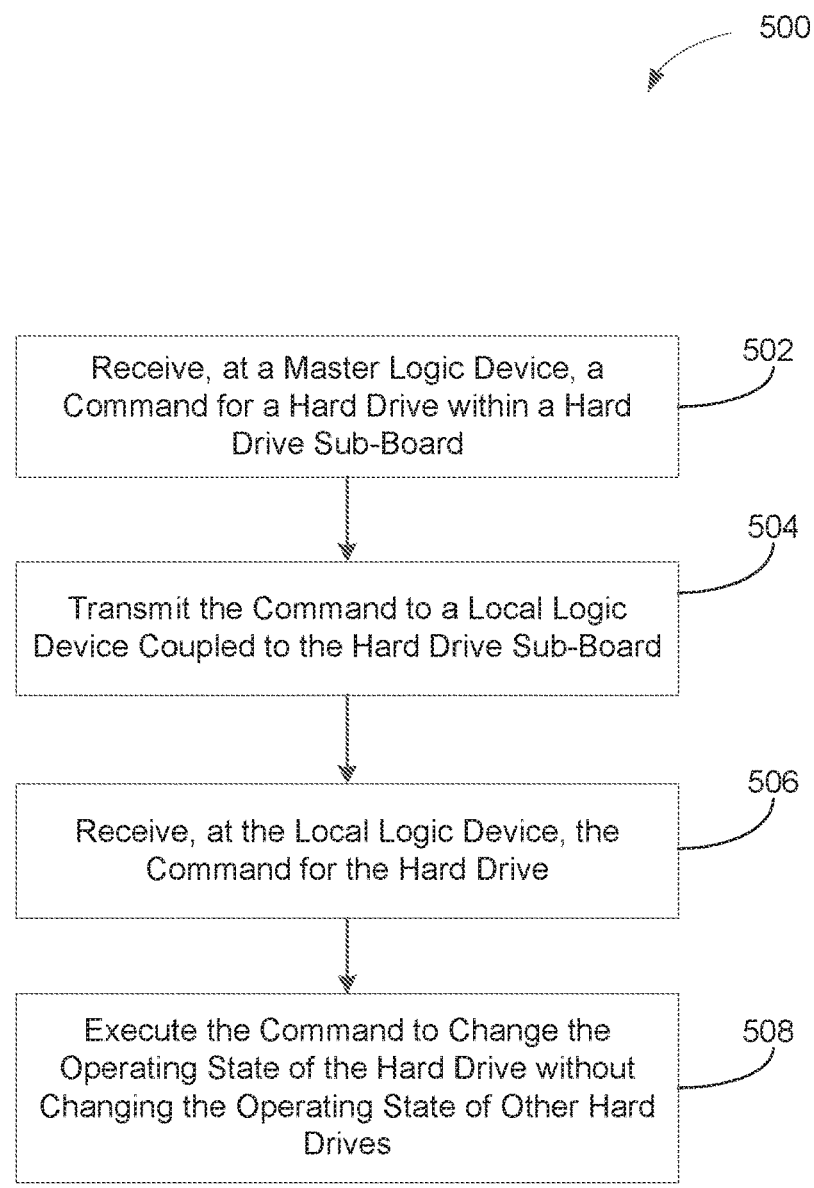
FIG. 5 is a flow diagram of method steps for changing the operating state of a hard drive that resides within a storage enclosure, according to various embodiments of the present invention.
Figure 6:
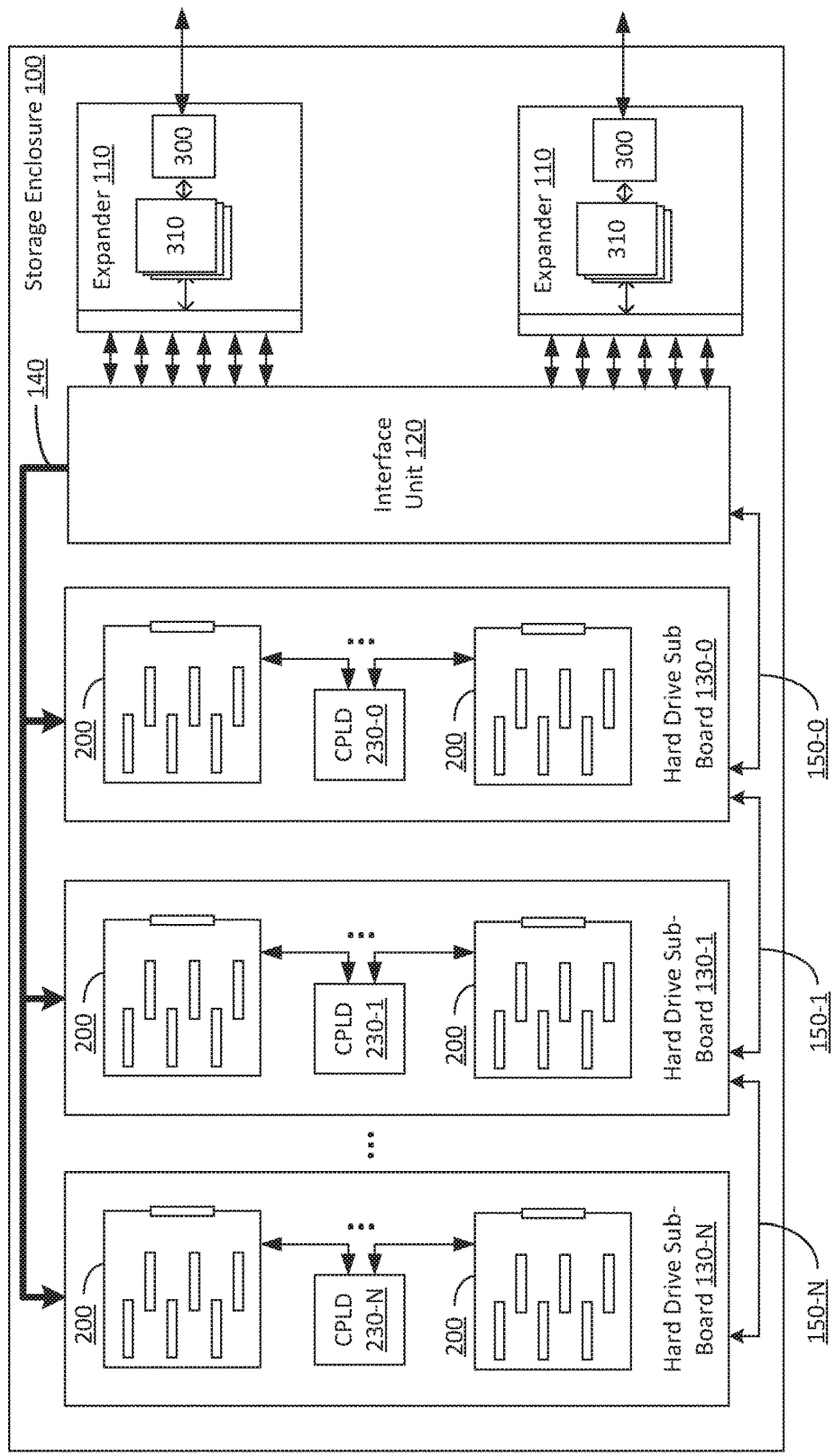

FIG. 5 is a flow diagram of method steps for changing the operating state of a single hard drive that resides in a storage enclosure, according to various embodiments of the present invention. Although the method steps are described in conjunction with the systems of FIGS. 1-4, persons skilled in the art will understand that any system configured to perform the method steps, in any order, is within the scope of the present invention.

As shown, a method 500 begins at step 502, where a master logic device, such as CPLD 300, receives a command for a hard drive 210 within a hard drive sub-board 130. The command may originate from a host computer system coupled to the storage enclosure 100. At step 504, the master logic device transmits the command to a local logic device that is configured to manage the hard drive sub-board 130 where the hard drive 210 resides. The local logic device could be, for example, local CPLD 230.

At step 506, the local logic device receives the command for the hard drive 210. At step 508, the local logic device executes the command to change the operating state of the hard drive 210, without changing the operating state of other hard drives 210 within the storage enclosure 100. With this approach, master and local logic devices, such as CPLDs 230 and 300, can operate in conjunction with one another to control the operation of hard drives 210 on an individual basis. Thus, CPLDs 230 and 300 may power on or off a single hard drive 210 without affecting the operating state of any other hard drives within the hard drive sub-board 130 or within storage enclosure 100.

In sum, a storage enclosure includes a plurality of hard drive sub-boards, each configured to include a plurality of hard drives. A local logic device manages each hard drive sub-board. A master logic device manages the local logic devices. The master logic device receives management commands from a host computer system coupled to the storage enclosure, and routes those commands to specific local logic devices. The local logic devices then relay the commands to specifically targeted hard drives. Thus, each hard drive within the storage enclosure can be independently controlled, allowing a single hard drive to be powered down without powering down other hard drives in the enclosure.

At least one advantage of the disclosed approach is that a host computer system coupled to the storage enclosure can exercise fine-grained control over the hard drives include within that enclosure. Thus, the host computer system can selectively power on and power off specific hard drives within the enclosure without affecting other hard drives. In addition, implementing a sideband cable as opposed to a set of PCB traces to route management commands may reduce the overall amount of crosstalk within the storage enclosure, thereby allowing the storage enclosure to include a greater number of hard drives than conventional enclosures.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

While the preceding is directed to embodiments of the present disclosure, other and further embodiments of the disclosure may be devised without departing from the basic scope thereof, and the scope thereof is determined by the claims that follow.

The invention claimed is:

1. A storage enclosure, comprising:
   a first hard drive sub-board coupled to a set of hard drives, wherein the set of hard drives includes:
   a first hard drive, and
   a second hard drive; and
   a first logic device included on the first hard drive sub-board and coupled to each hard drive included in the set of hard drives, the first logic device configured to:
   receive a first management command that is directed to the first hard drive, and
   transmit the first management command to the first hard drive for execution,
   wherein executing the first management command changes the operating state of the first hard drive;
   wherein the first hard drive sub-board is coupled to an interface unit via a first sideband cable and to a second hard drive sub-board via a second sideband cable, and the second hard drive sub-board is coupled to a third hard drive sub-board via a third sideband cable, and wherein the first hard drive sub-board is configured to receive management commands via the first sideband cable and to transmit management commands to the second hard drive sub-board via the second sideband cable, and the second hard drive sub-board is configured to transmit management commands to the third hard drive sub-board via the third sideband cable;
   wherein the first hard drive sub-board is further coupled to the interface unit via a first primary cable, and the second hard drive sub-board is coupled to the interface unit via a second primary cable, wherein the first primary cable and the second primary cable are distinct from the first sideband cable, the second sideband cable, and the third sideband cable, and wherein the first hard drive sub-board is configured to receive input/output data via the first primary cable.

2. The storage enclosure of claim 1, further comprising a second logic device coupled to the first logic device via the first sideband cable and configured to:
   receive the first management command from a host computer system; and
   transmit the first management command to the first logic device via the first sideband cable.

3. The storage enclosure of claim 2, wherein the first logic device and the first sideband cable are connected to the first hard drive sub-board.

4. The storage enclosure of claim 3, wherein the second hard drive also is connected to the first hard drive sub-board, and wherein the first logic device is configured to transmit management commands to the second hard drive independently of the first hard drive.

5. The storage enclosure of claim 3, wherein a third hard drive, a third logic device, and the second sideband cable are connected to the second hard drive sub-board, wherein the third logic device is configured to transmit management commands to the third hard drive independently of either the first hard drive or the second hard drive.

6. The storage enclosure of claim 5, wherein the first hard drive sub-board is configured to:
   receive a second management command for the third hard drive via the first sideband cable; and
   relay the second management command to the third logic device via the second sideband cable,
   wherein the third logic device, upon receipt of the second management command, transmits the second management command to the third hard drive for execution, and
   wherein executing the second management command changes the operating state of the third hard drive.

7. The storage enclosure of claim 1, wherein the first management command comprises a power-on or power-off command.

8. A subsystem, comprising:
   a first logic device included on a first hard drive sub-board and coupled to a first hard drive and a second hard drive, wherein the first hard drive and the second hard drive are coupled to the first hard drive sub-board, the first logic device configured to:
   communicate with the first hard drive to change the operating state of the first hard drive;
   wherein the first hard drive sub-board is coupled to an interface unit via a first sideband cable and to a second hard drive sub-board via a second sideband cable, and the second hard drive sub-board is coupled to a third hard drive sub-board via a third sideband cable, and wherein the first hard drive sub-board is configured to receive management commands via the first sideband cable and to transmit management commands to the second hard drive sub-board via the second sideband cable, and the second hard drive sub-board is configured to transmit management commands to the third hard drive sub-board via the third sideband cable;

wherein the first hard drive sub-board is further coupled to the interface unit via a first primary cable, and the second hard drive sub-board is coupled to the interface unit via a second primary cable, wherein the first primary cable and the second primary cable are distinct from the first sideband cable, the second sideband cable, and the third sideband cable, and wherein the first hard drive sub-board is configured to receive input/output data via the first primary cable.

9. The subsystem of claim 8, wherein the first logic device is further configured to receive a first management command that is directed to the first hard drive, and wherein communicating with the first hard drive comprises:

transmitting the first management command to the first hard drive for execution, wherein executing the first management command changes the operating state of the first hard drive.

10. The subsystem of claim 9, further comprising a second logic device coupled to the first logic device via the first sideband cable and configured to:

receive the first management command from a host computer system; and transmit the first management command to the first logic device via the first sideband cable.

11. The subsystem of claim 10, wherein the first logic device and the first sideband cable are connected to the first hard drive sub-board.

12. The subsystem of claim 11, wherein the second hard drive also is connected to the first hard drive sub-board, and wherein the first logic device is configured to transmit management commands to the second hard drive independently of the first hard drive.

13. The subsystem of claim 11, wherein a third hard drive, a third logic device, and the second sideband cable are connected to the second hard drive sub-board, wherein the third logic device is configured to transmit management commands to the third hard drive independently of either the first hard drive or the second hard drive.

14. The subsystem of claim 13, wherein the first hard drive sub-board is configured to:

receive a second management command for the third hard drive via the first sideband cable; and relay the second management command to the third logic device via the second sideband cable, wherein the third logic device, upon receipt of the second management command, transmits the second management command to the third hard drive for execution, and wherein executing the second management command changes the operating state of the third hard drive.

15. A computer-implemented method for changing the operating state of a hard drive, the method comprising:

receiving, at a first logic device, a first management command that is directed to a first hard drive included in a set of hard drives; and transmitting the first management command to the first hard drive for execution, wherein executing the first management command changes the operating state of the first hard drive;

wherein the first logic device is included on a first hard drive sub-board, the first hard drive sub-board coupled to each hard drive included in the set of hard drives;

wherein the first hard drive sub-board is coupled to an interface unit via a first sideband cable and to a second hard drive sub-board via a second sideband cable, and the second hard drive sub-board is coupled to a third hard drive sub-board via a third sideband cable, and wherein the first hard drive sub-board is configured to receive management commands via the first sideband cable and to transmit management commands to the second hard drive sub-board via the second sideband cable, and the second hard drive sub-board is configured to transmit management commands to the third hard drive sub-board via the third sideband cable;

wherein the first hard drive sub-board is further coupled to the interface unit via a first primary cable, and the second hard drive sub-board is coupled to the interface unit via a second primary cable, wherein the first primary cable and the second primary cable are distinct from the first sideband cable, the second sideband cable, and the third sideband cable, and wherein the first hard drive sub-board is configured to receive input/output data via the first primary cable.

16. The computer-implemented method of claim 15, further comprising:

receiving, at a second logic device, the first management command from a host computer system; and transmitting the first management command to the first logic device via the first sideband cable that couples the first logic device to the second logic device.

17. The computer-implemented method of claim 16, further comprising:

receiving, at the second logic device, a second management command from the host computer system; and transmitting, via the first sideband cable, the second management command to the first hard drive sub-board.

18. The computer-implemented method of claim 17, further comprising:

relaying, at the first hard drive sub-board, the second management command to a third logic device on the second hard drive sub-board via the second sideband cable, wherein the third logic device, upon receipt of the second management command, transmits the second management command to a third hard drive coupled to the second hard drive sub-board for execution, and wherein executing the second management command changes the operating state of the third hard drive.

19. The storage enclosure of claim 1, wherein the second hard drive sub-board is configured to receive input/output data via the second primary cable.

* * * * *